United States Patent
Lee et al.

(10) Patent No.: US 7,567,324 B2
(45) Date of Patent: Jul. 28, 2009

(54) LIQUID CRYSTAL DISPLAY DEVICE AND FABRICATION METHOD THEREOF

(75) Inventors: Kew Seung Lee, Seoul (KR); Sang Yun Lee, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 303 days.

(21) Appl. No.: 11/319,360

(22) Filed: Dec. 29, 2005

(65) Prior Publication Data

US 2007/0002229 A1   Jan. 4, 2007

(30) Foreign Application Priority Data

Jun. 30, 2005   (KR) .................. 10-2005-0058916

(51) Int. Cl.
*G02F 1/1343* (2006.01)

(52) U.S. Cl. .................. 349/139; 349/38; 349/39; 349/40; 349/41; 349/42; 349/43; 349/144; 349/149

(58) Field of Classification Search .................. 349/139, 349/38–43, 54, 46, 149
See application file for complete search history.

(56) References Cited

U.S. PATENT DOCUMENTS

| | | | |
|---|---|---|---|
| 5,668,650 A * | 9/1997 | Mori et al. ................. | 349/42 |
| 6,310,668 B1 | 10/2001 | Ukita | |
| 6,750,925 B2 * | 6/2004 | Hector et al. .................. | 349/39 |
| 6,842,200 B1 * | 1/2005 | Su et al. ........................ | 349/38 |
| 6,982,775 B2 * | 1/2006 | Lee et al. ..................... | 349/139 |
| 7,250,992 B2 * | 7/2007 | Lai .............................. | 349/54 |
| 2002/0018156 A1 | 2/2002 | Lee et al. | |
| 2003/0016310 A1 * | 1/2003 | Lee .............................. | 349/43 |
| 2003/0098935 A1 | 5/2003 | Lee et al. | |
| 2005/0146645 A1 | 7/2005 | Lai | |

OTHER PUBLICATIONS

Combined Search and Examination Report, Appln. No. GB0526403.1, dated Apr. 13, 2006.

* cited by examiner

*Primary Examiner*—Brian M. Healy
*Assistant Examiner*—Guy G Anderson
(74) *Attorney, Agent, or Firm*—Holland & Knight LLP

(57) ABSTRACT

A liquid crystal display device includes a liquid crystal display panel having an array substrate and a color filter substrate, a plurality of gate lines and a plurality of data lines arranged vertically and horizontally on the array substrate and defining a plurality of pixel regions, a first thin film transistor formed on the array substrate and having a first gate electrode, a first source electrode, a first drain electrode and a first active layer, and a first compensation pattern formed on at least one side of one of the first source electrode and first drain electrode of the first thin film transistor in a first pixel region at a first position of the plurality of pixel regions such that the first compensation pattern is partially overlapped by the first gate electrode.

2 Claims, 4 Drawing Sheets

LIQUID CRYSTAL DISPLAY DEVICE AND FABRICATION METHOD THEREOF

The present invention claims the benefit of Korean Patent Application No. 58916/2005 filed in Korea on Jun. 30, 2005, which is hereby incorporated by reference in its entirety.

BACKGROUND OF THE INVENTION

1. Field of the Invention

The present invention relates to a liquid crystal display (LCD) device and, more particularly, to an LCD device and a fabrication method thereof. Although the present invention is suitable for a wide scope of applications, it is particularly suitable for improving a residual image level of an LCD device.

2. Description of the Related Art

In general, the LCD device is a display device in which data signals corresponding to image information is supplied to a matrix of pixels. The data signals control optical transmittance of the pixels so as to display images. The LCD device includes a liquid crystal display panel in which the pixels are arranged in a matrix and a driving part for driving the pixels. The liquid crystal display panel includes an array substrate on which a thin film transistor (TFT) array is formed and a color filter substrate on which color filters are formed. The TFT array substrate and the color filter array substrate are attached to each other with a uniform cell gap maintained therebetween with a liquid crystal layer positioned within the cell gap. The array substrate and the color filter substrate are attached by a seal pattern formed along an outer edge of a pixel part.

Alignment films are formed on surfaces of the array substrate and the color filter substrate that face each other. The alignment films are rubbed to make liquid crystals be arranged in a predetermined direction. A polarization film and a retardation film are provided on each outer surface of the TFT array substrate and the color filter substrate. By selectively constructing a plurality of components, a liquid crystal display panel can have high luminance and good contrast characteristics by changing the direction and/or refracting the proceeding light.

FIG. 1 is a plan view of a related art LCD device. As shown in FIG. 1, the LCD device includes a pixel part 35 having pixels arranged in a matrix for displaying an image, a gate pad part 31 electrically connected with the gate lines 16 of the pixel part 35, and a data pad part 32 electrically connected with the data lines 17 of the pixel part 35. The gate pad part 31 and the data pad part 32 are formed at an edge portion of the array substrate 10, which is not overlapped by a color filter substrate 5. The gate pad part 31 supplies a scan signal from the gate driving unit (not shown) to the gate lines 16 of the pixel part 35, and the data pad part 32 supplies image information from the data driving unit (not shown) to the data lines 17 of the pixel part 35. The data lines 17 and the gate lines 16 are arranged to cross each other on the array substrate 10 to define pixel regions. A thin film transistor (not shown) and pixel electrodes (not shown) are provided in the pixel regions defined by the data lines 17 and the gate lines.

Although not shown in FIG. 1, color filters for each of the pixels are separated by a black matrix. Further, a common electrode, which is a counter electrode of the pixel electrode formed on the array substrate 10, is formed on the color filter substrate 5. A certain cell gap is maintained between the color filter substrate 10 and the array substrate 5 by spacers (not shown), and the color filter substrate 10 and the array substrate 5 are attached by a seal pattern 50 formed along an outer edge of the pixel part 35. In such an LCD device shown in FIG. 1, in general, parasitic capacitance (Cgd) is generated where the gate electrode and the source electrode overlap and/or where the gate electrode and the drain electrode of the TFT overlap. This parasitic capacitance causes a change in a voltage by an amount equaling $\Delta Vp$, which is called a level shift voltage or a kickback voltage.

The capacity of liquid crystal to maintain proper orientation degrade when a DC voltage is applied across liquid crystal in one direction for a long time. Accordingly, when liquid crystal is driven, the polarity of an applied voltage must be periodically changed. Due to the kickback voltage, a DC component from the parasitic component remains that causes bad effects, such as flickering, residual screen images and non-uniform screen brightness. Each of the TFTs in the pixel regions have a different kickback voltage depending on their positions in the panel. Thus, because the amount of the DC component remaining in the panel is different across the panel, a non-uniform residual image is generated.

FIG. 2 is a graph showing variation values of common voltages according to each position on the panel as simulated by a computer. As shown in FIG. 2, points indicated by a diamond shape and square shape show variation values of common voltages according to each position on the panel from a computer simulation while points indicated by a triangular shape show an average value of the simulation results. The X axis in the graph of FIG. 2 indicates a relative position on the panel and the Y axis indicates the size of each common voltage. In other words, the left side of the X axis refers to the left side on the panel based on the center of the panel while the right side of X axis refers to the right side on the panel. As shown in FIG. 2, the size of each common voltage is not consistent across the panel. More particularly, the common voltages differ depending on the position in the panel along the horizontal direction of the panel. Since the amount of the accumulated DC component is different depending on position in the panel, a non-uniform residual image (ghost) is created across the entire panel, which cannot be resolved by the existing method of uniformly compensating the common voltages across the panel.

BRIEF DESCRIPTION OF THE INVENTION

Accordingly, the present invention is directed to a liquid crystal display (LCD) device and, more particularly, to an LCD device and a fabrication method thereof that substantially obviates one or more of the problems due to limitations and disadvantages of the related art.

An object of the present invention is to provide a liquid crystal display (LCD) device and a fabrication method thereof having a minimized variation of kickback voltage across a panel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a liquid crystal display device includes a liquid crystal display panel having an array substrate and a color filter substrate, a plurality of gate lines and a plurality of data lines arranged vertically and horizontally on the array substrate and defining a plurality of pixel regions, a first thin film transistor formed on the array substrate and having a first gate electrode, a first source electrode, a first drain electrode and a first active layer, and a first compensation pattern formed on at least one side of one of the first source electrode and first drain electrode of the first thin film transistor in a first pixel region at a first position of the plurality of pixel regions such that the first compensation pattern is partially overlapped by the first gate electrode.

In another aspect, there is also provided a method for forming a liquid crystal display device includes providing an array substrate, forming a plurality of gate lines and a plurality of data lines on the array substrate to define a plurality of pixel regions, forming a first thin film transistor on the array substrate and having a first gate electrode, a first source electrode, a first drain electrode and a first active layer; and forming a first compensation pattern on at least one side of one of the first source electrode and first drain electrode of the first thin film transistor in first pixel region at a first position of the plurality of pixel regions such that the first compensation pattern is partially overlapped by the first gate electrode.

In another aspect, a liquid crystal display device includes a liquid crystal display panel having an array substrate and a color filter substrate, a plurality of gate lines and a plurality of data lines arranged vertically and horizontally on the array substrate and defining a plurality of pixel regions, a first thin film transistor formed on the array substrate and having a first gate electrode, a first source electrode, a first drain electrode and a first active layer, a first compensation pattern formed on at least one side of one of the first source electrode and first drain electrode of the first thin film transistor in a first pixel region at a first position in the plurality of pixel regions, and a second compensation pattern formed on at least one side of one of the second source electrode and the second drain electrode of the second thin film transistor in a second pixel region at a second position in the plurality of pixel regions, wherein a first kickback voltage in the first pixel area is smaller than a second kickback voltage in the second pixel area and the first and second compensation patterns compensate the first and second kickback voltages to operate at a common voltage.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

A liquid crystal display (LCD) device and its fabrication method in accordance with embodiments of the present invention will now be described with reference to FIGS. 3, 4A, 4B and 5.

Figure 1:
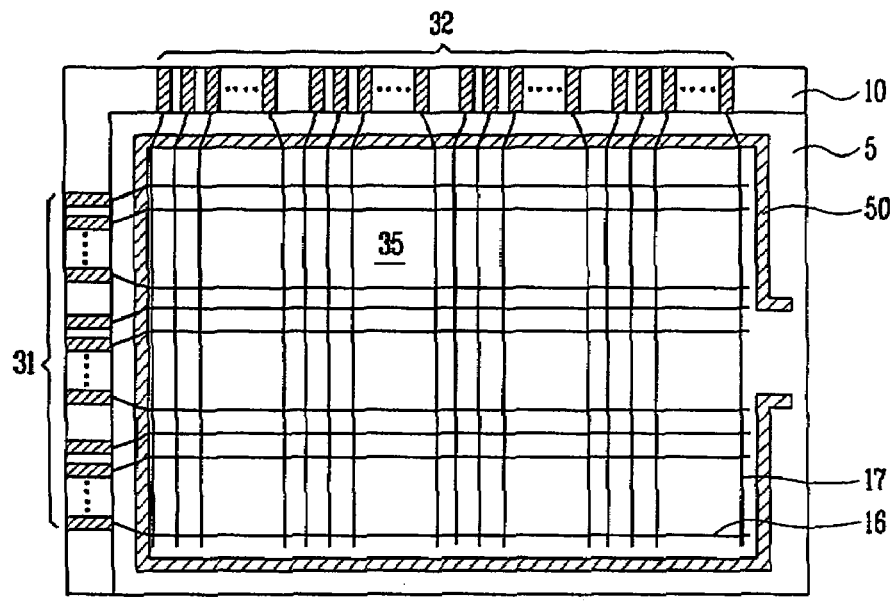
FIG. 1 is a plan view of a related art liquid crystal display (LCD) device.
Figure 2:
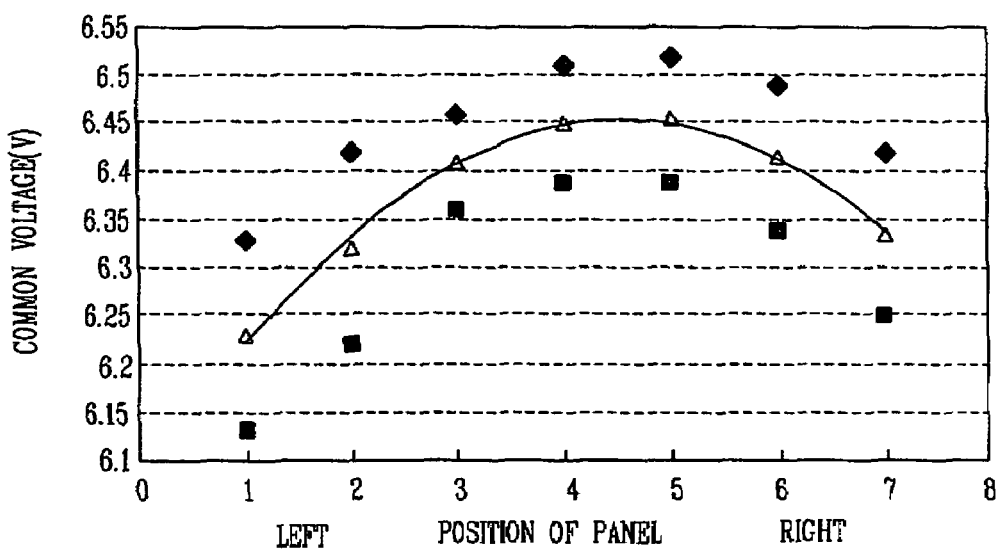
FIG. 2 is a graph showing variation values of common voltages according to each position on the panel in an LCD device.
Figure 3:
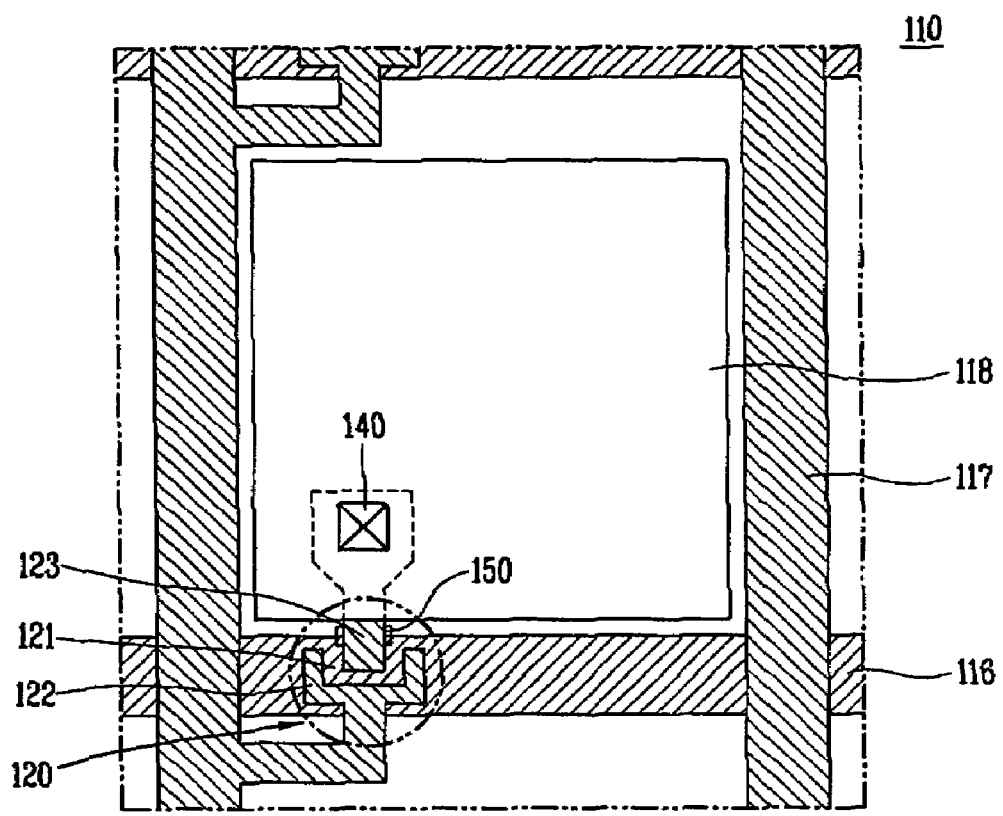
FIG. 3 is a plan view of one pixel, including a thin film transistor (TFT), on an array substrate in accordance with an embodiment of the present invention.

FIG. 3 is a plan view of one pixel, including a thin film transistor (TFT), on an array substrate in accordance with an embodiment of the present invention. Although an actual LCD device includes N×M number of pixels defined by N number of gate lines and M number of data lines, which cross each other, only one pixel is shown in FIG. 3 for the sake of explanation. As illustrated in FIG. 3, the array substrate 110 includes a gate line 116 and a data line 117 arranged horizontally and vertically thereon and defining a pixel region. A TFT 120, a switching device, is formed adjacent to the crossing of the gate line 116 and the data line 117. A pixel electrode 118 is formed in the pixel region. The pixel electrode is connected to the TFT 120 so as to drive liquid crystal (not shown) together with a common electrode of a color filter substrate (not shown).

As shown in FIG. 3, the TFT 120 includes a gate electrode 121 connected to the gate line 116, a source electrode 122 connected to the data line 117 and a drain electrode 123 connected to the pixel electrode 118. Although a TFT 120 with a U-shaped channel is shown in FIG. 3, embodiments of the present invention are not limited thereto. Embodiments of the present invention can be used in all types of TFTs of the pixel part for an LCD device, regardless of the shape of the channels in the TFTs.

The TFT 120 further includes a first insulation film (not shown) for insulating the gate electrode 121, source/drain electrodes 122 and 123, and an active layer (not shown) for forming a conductive channel between the source electrode 122 and the drain electrode 123 in response to a gate voltage supplied to the gate electrode 121. A portion of the source electrode 122 extends in one direction to form a portion of the data line 117. A portion of the drain electrode 123 is electrically connected through a contact hole 140 formed in a second insulation film (not shown) to the pixel electrode 118.

A compensation pattern 150 for compensating the amount of kickback voltages, which are different according to position on a panel, can be formed at the sides of the drain electrode 123 in TFTs of the pixel part for an LCD device so as to change parasitic capacitance of the TFTs. As stated above, in the TFT 120, parasitic capacitance (Cgd) is generated where the gate electrode 121 and the source electrode 122 overlap and where the gate electrode 121 and the drain electrode 123 overlap, so a pixel voltage is changed by the amount equaling the kickback voltage (ΔVp) due to the parasitic capacitance (Cgd). The kickback voltage can be expressed by the following equation:

$$\Delta Vp = Cgd \times \Delta Vg / \{Cgd + Clc + Cst\}$$

wherein Clc is capacitance of a liquid crystal capacitor, Cst is capacitance of a storage capacitor, and ΔVg is a difference between a high gate voltage and a low gate voltage.

The kickback voltage is calculated based on the variables of Cgd, Clc, Cst and ΔVg. If the size of the parasitic capacitance Cgd can be controlled, the kickback voltage ΔVp can be controlled to have values from '0' to ΔVg. Thus, the kickback voltage ΔVp of each pixel can be individually controlled by changing the size of the parasitic capacitance (Cgd) at each pixel so as to create the same the kickback voltage ΔVp across the panel. In embodiments of the present invention, the size of the parasitic capacitance in each pixel according to position of the panel is controlled by the compensation pattern formed at the side or sides of the one of or both the drain electrode and the source electrode. More specifically, the compensation pattern has an appropriate size so as to achieve a desired parasitic capacitance in that pixel.

Figure 4A:
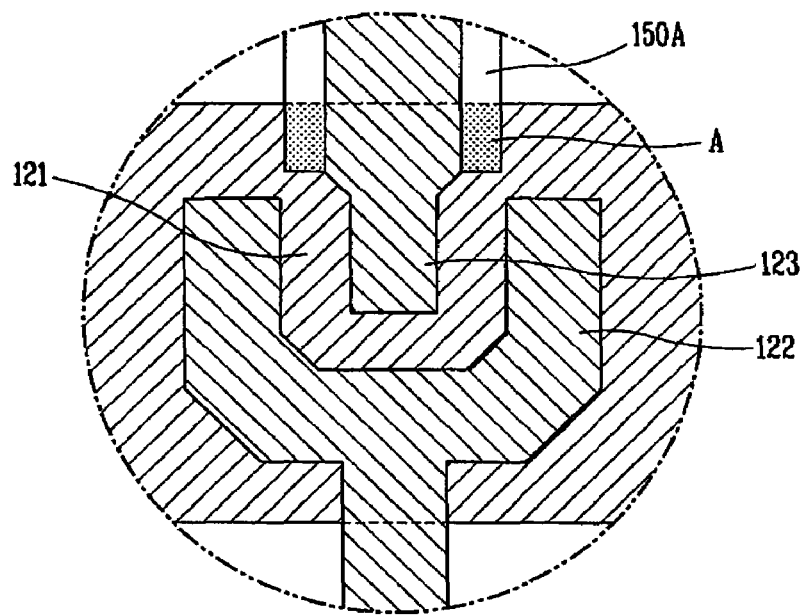
FIGS. 4A and 4B are enlarged plan views showing TFTs formed at different positions on the panel.
Figure 4B:
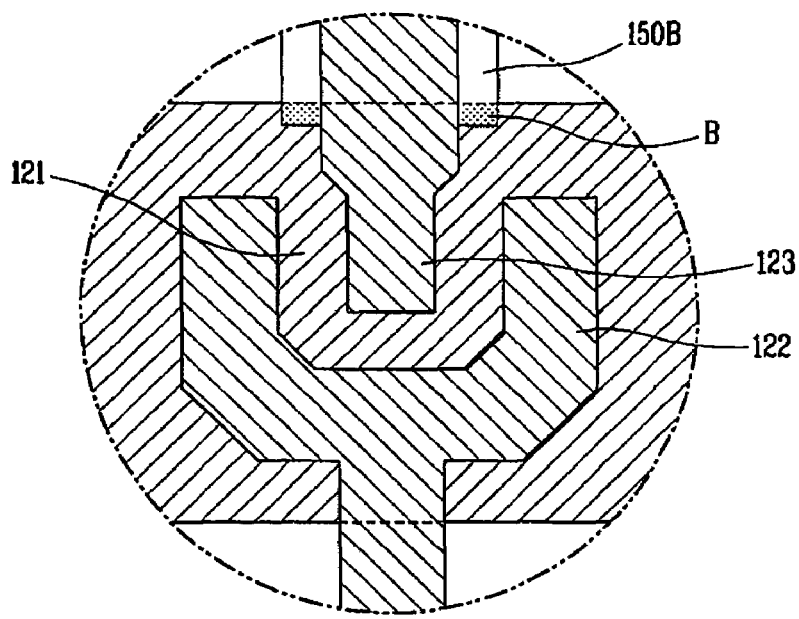

FIGS. 4A and 4B are enlarged plan views showing TFTs formed at different positions on the panel. For the sake of explanation, FIG. 4A shows a first TFT formed at a first position while FIG. 4B shows a second TFT formed at a second position. As shown in FIGS. 4A and 4B, the TFTs include the gate electrode 121 connected to the gate line, the source electrode 122 connected to the data line, and the drain electrode 123 connected to the pixel electrode. In addition, the TFTs also include the first insulation film (not shown) for insulating the gate electrode 121 and the source/drain electrodes 122 and 123, and an active layer for forming the conductive channel (not shown) between the source electrode 122 and the drain electrode 123 in response to a gate voltage supplied to the gate electrode 121.

The first TFT in FIG. 4A has the same structure as the second TFT in FIG. 4B except for that the gate electrode 121 in FIG. 4A overlaps larger area of compensation patterns 150A than the area of compensation patterns 150B overlapped by the gate electrode 121 in FIG. 4A. More particularly, the first TFT at the first position includes the first compensation pattern 150A having a region 'A' overlapped by the gate electrode 121 and the second TFT at the second position includes the second compensation pattern 150B having a region 'B' overlapped by the gate electrode 121.

A situation where the value of the kickback voltage at the first position in FIG. 4A is smaller than at the second position in FIG. 4B when the compensation patterns 150A and 150B are not formed will now be discussed as an example. As shown in FIGS. 4A and 4B, if the region 'A' of the first compensation pattern 150A overlapped by the gate electrode 121 is designed to be greater than the region 'B' of the second compensation pattern 150B overlapped by the gate electrode 121, the parasitic capacitance the first TFT is increased more than the increase in the parasitic capacitance of the second TFT. Accordingly, a value of the compensated kickback voltage at the first TFT at the first position is greater than a value of the compensated kickback voltage of the second TFT at the second position. Thus, the difference of kickback voltage between the first and second regions can be compensated to make the values of the overall kickback voltages, including both actual and compensated kickback voltages, at the first and second positions to be about the same. Further, the overall kickback voltages, which are about the same for the first and second positions, can be about the same as the kickback voltage at a third position at which a third TFT does not contain a compensation pattern.

The method for compensating the kickback voltage with respect to two or three positions are examples that the present invention is not limited thereto. Embodiments of the present invention can be applied to many TFTs at many positions to compensate kickback voltages with different parasitic capacitances so as the same overall kickback voltages across a panel. The compensation patterns 150A and 150B can be formed of the same conductive material as that of the source electrode 122 and the drain electrode 123 when the source electrode 122 and the drain electrode 123 are formed, or can be formed of a different conductive material.

Although FIGS. 4A and 4B show compensation patterns 150A and 150B formed at both sides of the drain electrode 123, embodiments of the present invention are not limited thereto. The compensation pattern can be formed at only one side of the drain electrode 123. Further, instead of separately forming the compensation pattern 150 at a side or sides of the drain electrode, the compensation pattern 150 can be integrally formed with the drain electrode 123. In other words, embodiments of the present invention can be applied to a case where the overlap of the drain electrode 123 by the lower gate electrode 121 is controlled by varying the width of the drain electrode 123. In addition or in the alternative, compensation patterns can be formed at the side or sides of the source electrode 121 in the TFTs.

Figure 5:
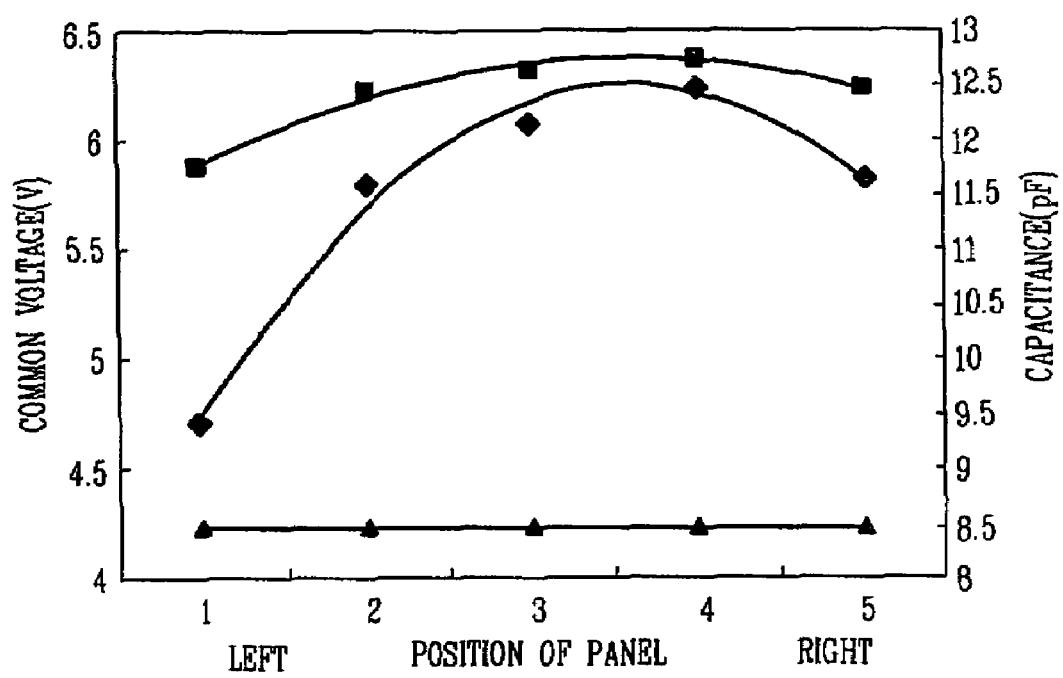
FIG. 5 is a graph showing variation values of common voltages according to each position on the panel in a general LCD device.

FIG. 5 is a graph showing variation values of common voltages corresponding to positions on the panel according to a computer simulation. More particularly, the square-shaped points indicate variation values of common voltages according to each position on a panel before kickback voltages are compensated according to a computer simulation, triangular-shaped points indicate variation values of common voltages according to each position on the panel after the kickback voltages are compensated, and diamond-shaped points indicate the size of compensating parasitic capacitances used for compensating the kickback voltages according to each position on the panel.

With reference to FIG. 5, before the kickback voltages are compensated, the common voltages are not uniform across the panel. However, after the kickback voltages are compensated by forming the compensation pattern as described above, substantially the same common voltage can be obtained across the panel. The X axis in the graph of FIG. 5 indicates a relative position on the panel and the Y axis indicates the size of each common voltage. In other words, the left side of the X axis refers to the left side on the panel based on the center of the panel while the right side of X axis refers to the right side on the panel.

The graph of FIG. 5 shows that the center of the panel has the highest common voltage and the size of the common voltage decreases as it goes from the center to the left and right sides. Before the kickback voltages are compensated, each of the common voltages with respect to position are different across the horizontal direction of the panel, which indicates that a different amount of DC components are accumulating at different positions on the panel. As a result, before the kickback voltages are compensated, non-uniform residual images are created on the entire panel.

The common voltage and the kickback voltage have substantially linear relationship, so that when signal voltages of the opposite positive and negative polarity are inputted sequentially, the kickback voltage can be obtained by subtracting the size of the common voltage from a central value of the signal voltages. In this manner, in the case where the center of the panel has the common voltage of greater size than that of the left and right portions of the panel, a compensation pattern is designed such that larger parasitic capacitance is formed at the center of the panel with compensation patterns than at the left and right portions of the panel. Accordingly, the uniform kickback voltage can be obtained across the entire panel and thus flickering a local residual image can be prevented.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:

a liquid crystal display panel having an array substrate and a color filter substrate;

a plurality of gate lines and a plurality of data lines arranged vertically and horizontally on the array substrate and defining a plurality of pixel regions;

a first thin film transistor formed on the array substrate and having a first gate electrode, a first source electrode, a first drain electrode and a first active layer for forming a first conductive channel between the first source electrode and the first drain electrode; and a first compensation pattern formed on both sides of one of the first source electrode and the first drain electrode of the first thin film transistor in a first pixel region at a first position of the plurality of pixel regions such that the first compensation pattern is partially overlapped by the first gate electrode, wherein the first compensation pattern is made of the same conductive material as one of the first source electrode and the first drain electrode and wherein the first compensation pattern is located at both sides of one of the first source electrode and the first drain electrode but not in the first conductive channel.

2. A liquid crystal display device comprising:

a liquid crystal display panel having an array substrate and a color filter substrate;

a plurality of gate lines and a plurality of data lines arranged vertically and horizontally on the array substrate and defining a plurality of pixel regions;

a first thin film transistor formed on the array substrate and having a first gate electrode, a first source electrode, a first drain electrode and a first active layer for forming a first conductive channel between the first source electrode and the first drain electrode;

a second thin film transistor formed on the array substrate and having a second gate electrode, a second source electrode, a second drain electrode and a second active layer for forming a second conductive channel between the second source electrode and the second drain electrode;

a first compensation pattern formed on both sides of one of the first source electrode and the first drain electrode of the first thin film transistor in a first pixel region at a first position in the plurality of pixel regions; and a second compensation pattern formed on both sides of one of the second source electrode and the second drain electrode of the second thin film transistor in a second pixel region at a second position in the plurality of pixel regions, wherein a first kickback voltage in the first pixel region is smaller than a second kickback voltage in the second pixel region and the first and second compensation patterns compensate the first and second kickback voltages to operate at a common voltages, wherein a first area of the first compensation pattern overlapped by the first gate electrode of the first thin film transistor is greater than a second area of the second compensation pattern overlapped by the second gate electrode of the second thin film transistors, wherein the first compensation pattern is located at both sides of one of the first source electrode and the first drain electrode but not in the first conductive channel and wherein the second compensation pattern is located at both sides of one of the second source electrode and the second drain electrode but not in the second conductive channel.

* * * * *